United States Patent
Aoyagi et al.

(10) Patent No.: US 8,090,093 B2
(45) Date of Patent: Jan. 3, 2012

(54) ECHO CANCELLER

(75) Inventors: Hiromi Aoyagi, Kanagawa (JP);
Masashi Takada, Kanagawa (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 1039 days.

(21) Appl. No.: 11/988,005

(22) PCT Filed: Dec. 20, 2006

(86) PCT No.: PCT/JP2006/325356
§ 371 (c)(1),
(2), (4) Date: Dec. 28, 2007

(87) PCT Pub. No.: WO2007/080758
PCT Pub. Date: Jul. 19, 2007

(65) Prior Publication Data
US 2009/0129584 A1    May 21, 2009

(30) Foreign Application Priority Data

Jan. 13, 2006    (JP) .................................. 2006-006502

(51) Int. Cl.
*H04M 9/08* (2006.01)
*H04B 1/38* (2006.01)
*A61F 11/06* (2006.01)

(52) U.S. Cl. .............. 379/406.01; 379/406.04; 455/570; 381/71.11

(58) Field of Classification Search .................. None
See application file for complete search history.

(56) References Cited

U.S. PATENT DOCUMENTS

| | | | | |
|---|---|---|---|---|
| 4,764,955 | A * | 8/1988 | Galand et al. | 379/406.1 |
| 6,031,882 | A * | 2/2000 | Enge et al. | 375/343 |
| 6,654,463 | B1 * | 11/2003 | Leonidov et al. | 379/406.08 |
| 2002/0126855 | A1* | 9/2002 | Terada et al. | 381/93 |
| 2003/0112758 | A1* | 6/2003 | Pang et al. | 370/235 |
| 2004/0001450 | A1* | 1/2004 | He et al. | 370/286 |
| 2004/0058653 | A1* | 3/2004 | Dent | 455/69 |
| 2004/0086109 | A1* | 5/2004 | Takada | 379/406.08 |
| 2005/0169458 | A1* | 8/2005 | Johnston et al. | 379/406.08 |

FOREIGN PATENT DOCUMENTS

| | | |
|---|---|---|
| EP | 0221221 A1 | 5/1987 |
| JP | 62-107533 | 5/1987 |
| JP | 05-206898 | 8/1993 |
| JP | 07-283859 | 10/1995 |

(Continued)

*Primary Examiner* — Fan Tsang
*Assistant Examiner* — Jeffrey Lytle
(74) *Attorney, Agent, or Firm* — Rabin & Berdo, P.C.

(57) ABSTRACT

An echo canceller which can respond to a sudden change in echo characteristics in real time and does not require an alteration outside the echo canceller, includes a smoothed sending-speech signal calculation means for calculating a smoothed sending-speech signal from the sending-speech signal, the smoothed sending-speech signal being obtained by smoothing the sending-speech signal; a smoothed receiving-speech signal calculation means for calculating a smoothed receiving-speech signal from the receiving-speech signal, the smoothed receiving-speech signal being obtained by smoothing the receiving-speech signal; a delay time information generation means for obtaining delay time information reflecting delay characteristics of an echo path in accordance with a correlation between the smoothed sending-speech signal and the smoothed receiving-speech signal; and an update information generation means for obtaining update information indicating execution or suspension of updating of the tap coefficients of the adaptive filter, in accordance with the sending-speech signal, the receiving-speech signal, and the delay time information.

8 Claims, 7 Drawing Sheets

FOREIGN PATENT DOCUMENTS

| | | |
|---|---|---|
| JP | 09-055687 | 2/1997 |
| JP | 10-285082 | 10/1998 |
| JP | 2003-051879 A | 2/2003 |
| JP | 2003-134005 A | 5/2003 |
| JP | 2004-040589 | 2/2004 |
| JP | 2005-244538 A | 9/2005 |

* cited by examiner

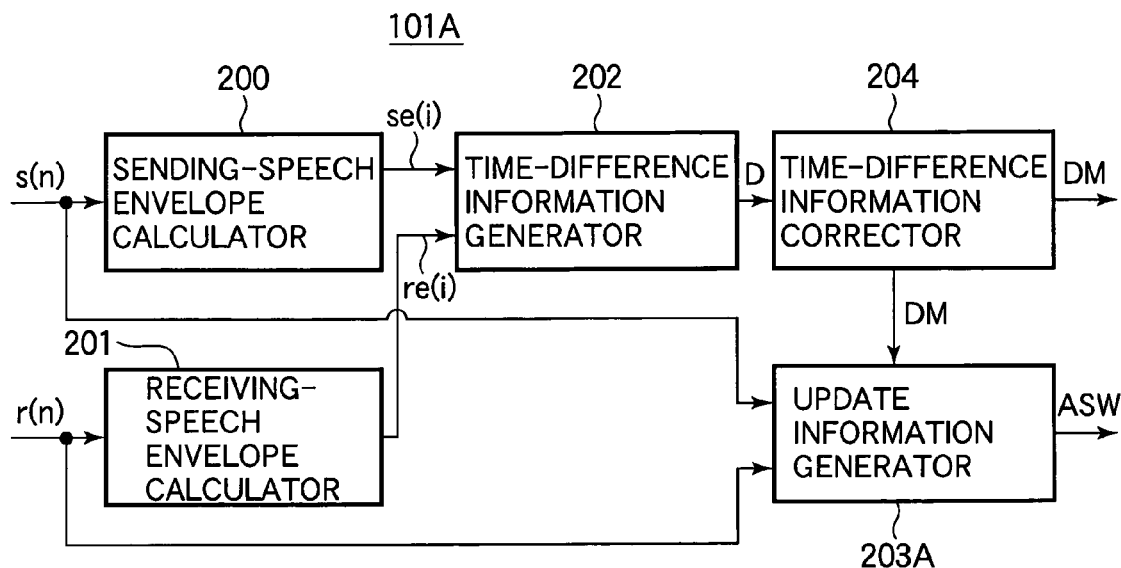
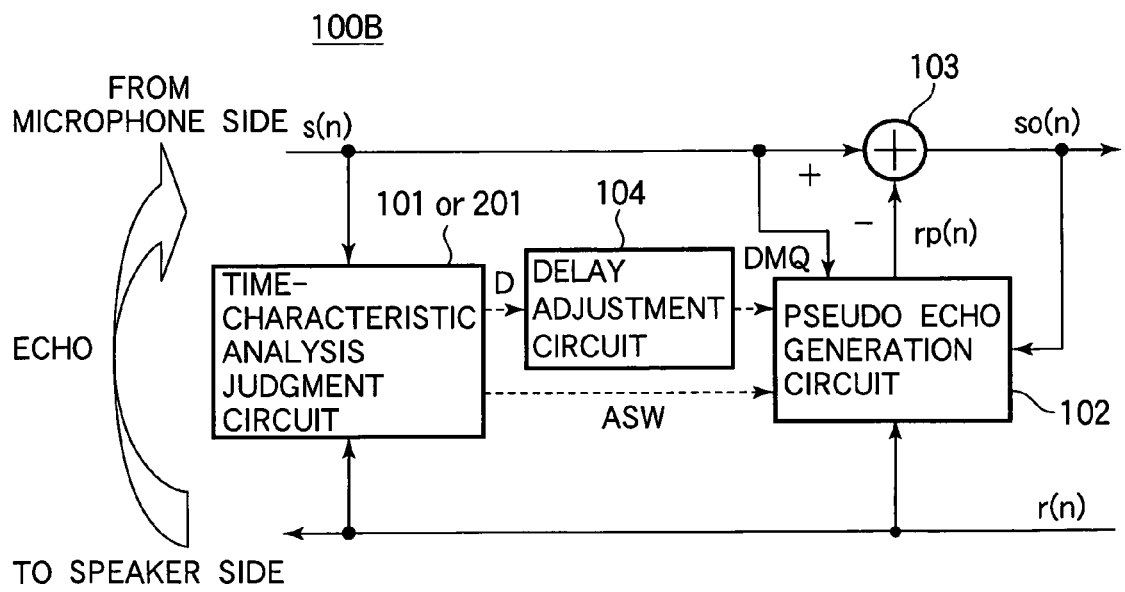

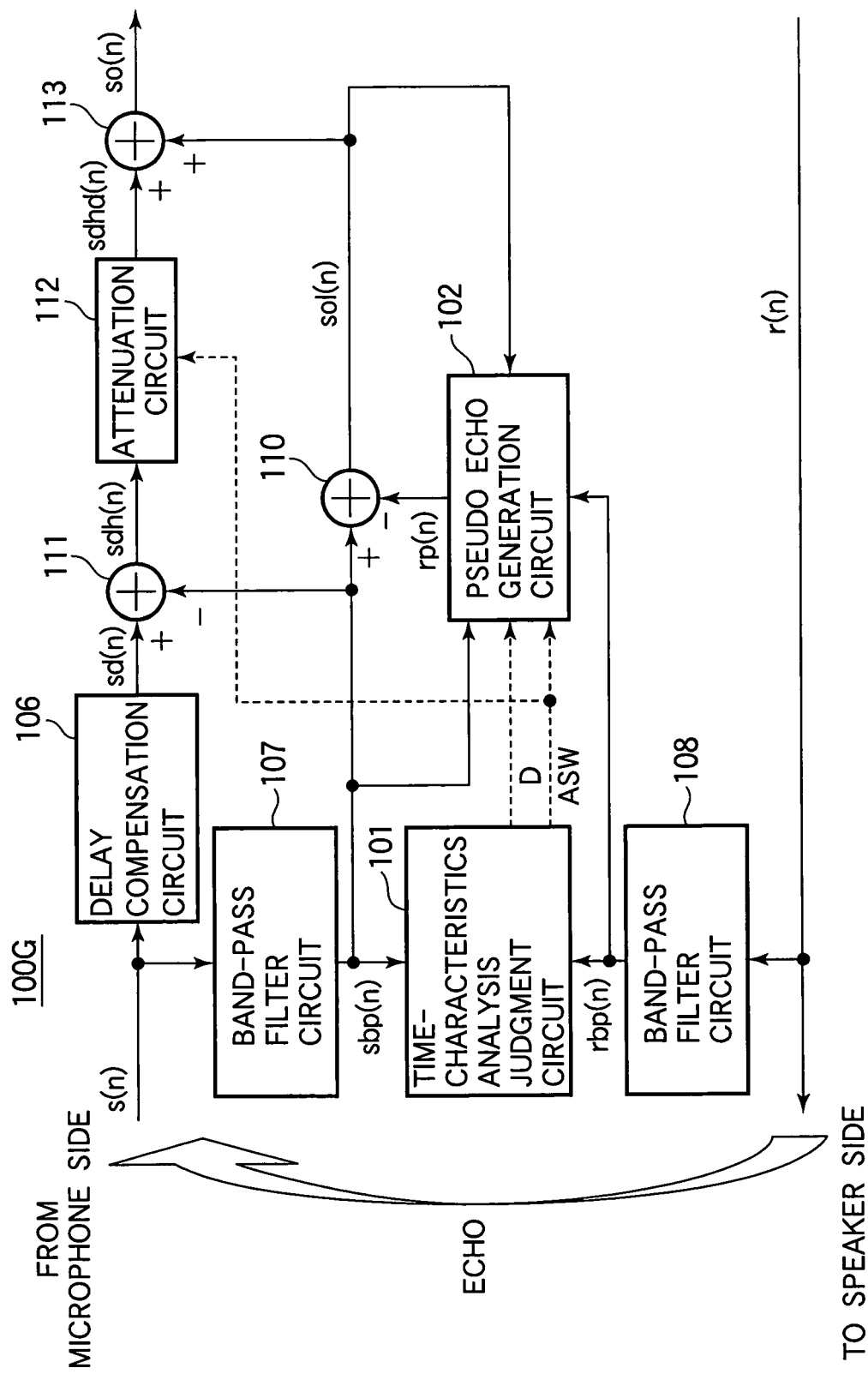

ECHO CANCELLER

TECHNICAL FIELD

The present invention relates to an echo canceller and is applicable to, for example, an echo canceller incorporated in a personal computer.

BACKGROUND ART

IP telephones using VoIP (Voice over Internet Protocol) which is a technology for sending an audio signal by using an IP network such as the Internet, have been spread in recent years. For example, an IP telephone referred to as a softphone which operates on a personal computer (PC), has come into widespread use. The softphone uses a sound device (including an A-D converter or a D-A converter) incorporated in the PC to input and output voice.

However, a driver of the sound device and the other software running on the PC operate in a time-sharing manner. Therefore, some processing of the other software may make it impossible to process an audio signal within a period predetermined in consideration of voice input/output.

As a result, the audio signal input/output becomes discontinuous, with some intervals or omissions, and the echo canceller assumes that the characteristics of the echo path (e.g., a delay time) are changing. This type of characteristics changes in the echo path include a sudden change resulting from the time-sharing processing with other software processing. Therefore, it has been hard to cancel acoustic echo components included in the audio signal supplied from a microphone.

As one method to cope with the changes in the echo characteristics, a hardware configuration has been proposed as disclosed in patent document 1.

The technology disclosed in patent document 1 allows a reference signal line to be routed through a buffer on the receiving side and a buffer on the sending side just by establishing a short circuit between a stereo output terminal and a stereo input terminal by a jumper and by connecting a stereo signal line on the sending side, which is the reference signal line in the PC, to an adaptive filter, so that a sound board used for inputting/outputting music data can be used as it is, without changing the internal configuration.

Patent document 1 is Japanese Patent Application Kokai (Laid-open) Publication No. 2004-40589.

DISCLOSURE OF INVENTION

Problems to be Solved by the Invention

The technology disclosed in patent document 1, however, requires an alteration of the PC or an addition of a special device, which may adversely affect the functional characteristics of the general-purpose PC, causing the speaker or the PC user, to perceive reduced ease of use.

Accordingly, such an echo canceller is desired that an echo can be cancelled appropriately even in an environment where the delay characteristics of the echo path change suddenly. In addition, the echo canceller should eliminate the need for routing a line to the outside, except for the input/output lines, or the need for disposing a special device outside.

Means of Solving the Problem

In order to solve such problem, the present invention has been made. An echo canceller of the present invention includes a pseudo echo generation means including an adaptive filter, the pseudo echo generation means generating a pseudo echo signal in accordance with a receiving-speech signal; and an echo cancellation means which subtracts the pseudo echo signal from a sending-speech signal, thereby canceling an echo signal from the sending-speech signal. The echo canceller further includes a smoothed sending-speech signal calculation means which calculates a smoothed sending-speech signal from the sending-speech signal, the smoothed sending-speech signal being obtained by smoothing the sending-speech signal; a smoothed receiving-speech signal calculation means which calculates a smoothed receiving-speech signal from the receiving-speech signal, the smoothed receiving-speech signal being obtained by smoothing the receiving-speech signal; a delay time information generation means which obtains delay time information reflecting delay characteristics of an echo path, in accordance with a correlation between the smoothed sending-speech signal and the smoothed receiving-speech signal; and an update information generation means which obtains update information indicating execution of updating of the tap coefficients of the adaptive filter or suspension of updating of the tap coefficients of the adaptive filter, in accordance with the sending-speech signal, the receiving-speech signal, and the delay time information. If the update information indicates the execution of updating, the pseudo echo generation means updates the tap coefficients and receives the delay time information as information reflecting the delay characteristics of the echo path to perform processing of the received delay time information.

Effects of the Invention

The present invention can provide an echo canceller which can obtain information needed for echo cancellation operations, such as an initial delay time and whether tap coefficients should be updated or not, by using a correlation in terms of time between a smoothed receiving-speech signal and a smoothed sending-speech signal, can respond to a sudden change in echo characteristics in real time, and does not require an alternation outside the echo canceller.

BRIEF DESCRIPTION OF THE DRAWINGS

FIG. 6 is a block diagram showing a detailed configuration of a time-characteristics analysis judgment circuit in the second embodiment;

FIG. 7 is a block diagram showing an echo canceller of the third embodiment;

FIG. 13 is a block diagram showing a configuration of an echo canceller of the eighth embodiment.

DESCRIPTION OF THE REFERENCE SYMBOLS 100, 100A, 100B, 100C, 100D, 100E, 100F, 100G echo canceller;
101, 101A time-characteristics analysis judgment circuit;
102, 102B, 102C, 102D pseudo echo generation circuit;
103, 110, 111, 113 adder;
104 delay adjustment circuit;
105 inadequate-coefficient detection circuit;
106, 109 delay compensation circuit;
107, 108 band-pass filter circuit;
112 attenuation circuit;
200 sending-speech envelope calculator;
201 receiving-speech envelope calculator;
202 time-difference information generator;
203, 203A update information generator;
204 time-difference information corrector;
300 adaptive filter;
301 coefficient calculator;
302 coefficient update controller;
303 time-difference comparator;
304 previous time-difference storage.

BEST MODE FOR CARRYING OUT THE INVENTION (A) First Embodiment

An echo canceller of the first embodiment of the present invention will be described below with reference to the drawings.

(A-1) Configuration of First Embodiment

The echo canceller of the first embodiment is incorporated in a PC, for example. The echo canceller of the first embodiment may be built as an echo cancellation dedicated board, may be implemented by writing an echo cancellation program in a DSP (digital signal processor), or may be implemented by a CPU and software (echo cancellation program) executed by the CPU. From the viewpoint of functions, the echo canceller of the first embodiment can be expressed as shown in FIG. 1.

Figure 1:
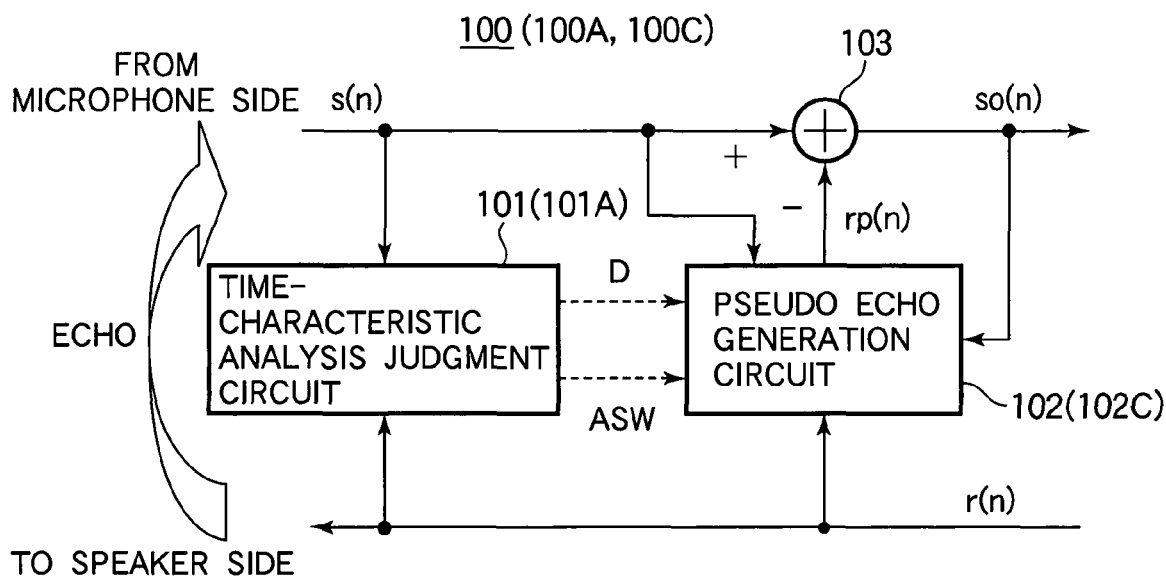
FIG. 1 is a block diagram showing a configuration of an echo canceller of the first embodiment.

Referring to FIG. 1, an echo canceller 100 of the first embodiment includes a time-characteristics analysis judgment circuit 101, a pseudo echo generation circuit 102, and an adder 103.

The echo canceller 100 of the first embodiment cancels a component of a digital receiving-speech signal (hereinafter referred to as a receiving-speech signal) r(n) coming from a remote place, included in a digital sending-speech signal (hereinafter referred to as a sending-speech signal) s(n) which is produced by capturing a sound by a microphone (which is not shown in the drawings) and digitizing a signal of the captured sound. In the first embodiment, it is assumed that delay characteristics in an echo path are not constant so that a receiving-speech signal r(n) outputted from the echo canceller 100 at a point in time is included as an echo component in a sending-speech signal s(n) inputted to the echo canceller 100. For example, if a configuration for processing the receiving-speech signal on a speaker side of the echo canceller 100 or a configuration for processing the sending-speech signal on a microphone side of the echo canceller 100 is a software processing configuration using time-sharing processing by the CPU, this type of change of the delay characteristics occurs.

The pseudo echo generation circuit 102 includes an adaptive filter, and generates a pseudo echo signal rp(n) through convolution of the receiving-speech signal r(n) and the tap coefficients h(k) to supply the generated signal to the adder 103. General algorithms such as the LMS (Least Mean Square) algorithm and the NLMS (Normalized LMS) algorithm can be used as an adaptive algorithm used for updating the tap coefficients of the adaptive filter.

In the first embodiment, the pseudo echo generation circuit 102 is configured so as to execute or suspend the updating of the tap coefficients of the internal adaptive filter in accordance with update information ASW, which will be described later, supplied from the time-characteristics analysis judgment circuit 101. Further, the pseudo echo generation circuit 102 is configured so as to control a range of the tap coefficients (a tap length P or a time D×N of the receiving-speech signal at the latest tap) used for generating the pseudo echo signal rp(n) in accordance with time-difference information D, which will be described later, supplied from the time-characteristics analysis judgment circuit 101. The pseudo echo generation circuit 102 is configured so as to contain a table associating an initial delay time D with the tap length P, for example, and to change the tap length P in accordance with the time-difference information D supplied from the time-characteristics analysis judgment circuit 101. For example, the tap length P at each time is achieved practically by setting the number of the taps prepared in advance to the maximum value of an allowable value as a value of the tap length P and setting a tap coefficient or coefficients of an unused tap or taps to a value of zero.

The adder 103 subtracts the pseudo echo signal rp(n) from the sending-speech signal s(n) to cancel the echo components from the sending-speech signal s(n) and outputs an echo-cancelled sending-speech signal so(n).

The time-characteristics analysis judgment circuit 101 is a constituent element as a characteristic part of the echo canceller 100 of the first embodiment. The time-characteristics analysis judgment circuit 101 generates the update information ASW and the time-difference information D from the receiving-speech signal r(n) and the sending-speech signal s(n) to supply the generated information to the pseudo echo generation circuit 102.

Figure 2:
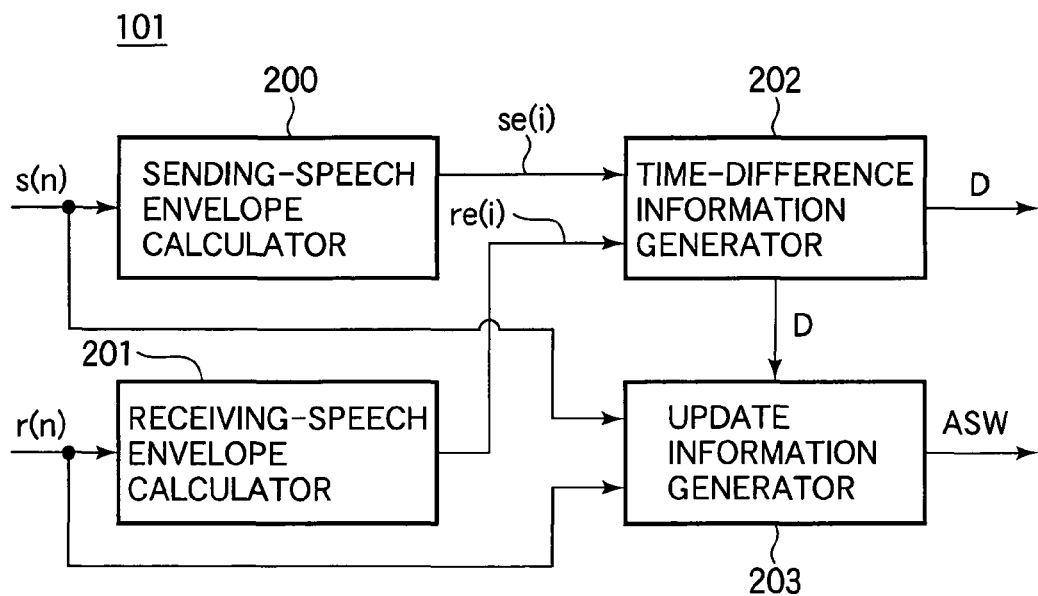
FIG. 2 is a block diagram showing a detailed configuration of a time-characteristics analysis judgment circuit in the first embodiment.

FIG. 2 is a block diagram showing a detailed functional configuration of the time-characteristics analysis judgment circuit 101 of the first embodiment. Referring to FIG. 2, the time-characteristics analysis judgment circuit 101 includes a sending-speech envelope calculator 200, a receiving-speech envelope calculator 201, a time-difference information generator 202, and an update information generator 203. For example, if the time-characteristics analysis judgment circuit 101 is implemented by a CPU and a program executed by the CPU, the sending-speech envelope calculator 200, the receiving-speech envelope calculator 201, the time-difference information generator 202, and the update information generator 203 respectively correspond to the CPU and a subprogram executed by the CPU.

The sending-speech envelope calculator 200 calculates a sending-speech envelope signal se(i) by smoothing the sending-speech signal s(n). The receiving-speech envelope calculator 201 calculates a receiving-speech envelope signal re(i) by smoothing the receiving-speech signal r(n). The time-difference information generator 202 generates the time-difference information D from the sending-speech envelope signal se(i) and the receiving-speech envelope signal re(i). The update information generator 203 generates the update information ASW in accordance with the sending-speech signal s(i), the receiving-speech signal r(i), and the time-difference information D.

The specific processing in the sending-speech envelope calculator 200, the receiving-speech envelope calculator 201, the time-difference information generator 202, and the update information generator 203 will be disclosed in the subsequent part describing the operation.

(A-2) Operation of First Embodiment

The operation (echo cancellation method) of the echo canceller 100 of the first embodiment will next be described. The operation described below may be implemented by an echo cancellation program executed by the CPU.

Since a main feature of the first embodiment is that the time-characteristics analysis judgment circuit 101 is provided, the description is made with emphasis put on the operation of the time-characteristics analysis judgment circuit 101.

The time-characteristics analysis judgment circuit 101 (the sending-speech envelope calculator 200 and the receiving-speech envelope calculator 201 provided therein) calculates the sending-speech envelope signal se(i) and the receiving-speech envelope signal re(i) from the sending-speech signal s(n) and the receiving-speech signal r(n) respectively, in accordance with equations (1) and (2), for example.

$$se(i) = \Sigma |s(n)| \quad (1)$$

$$re(i) = \Sigma |r(n)| \quad (2)$$

Figure 3:
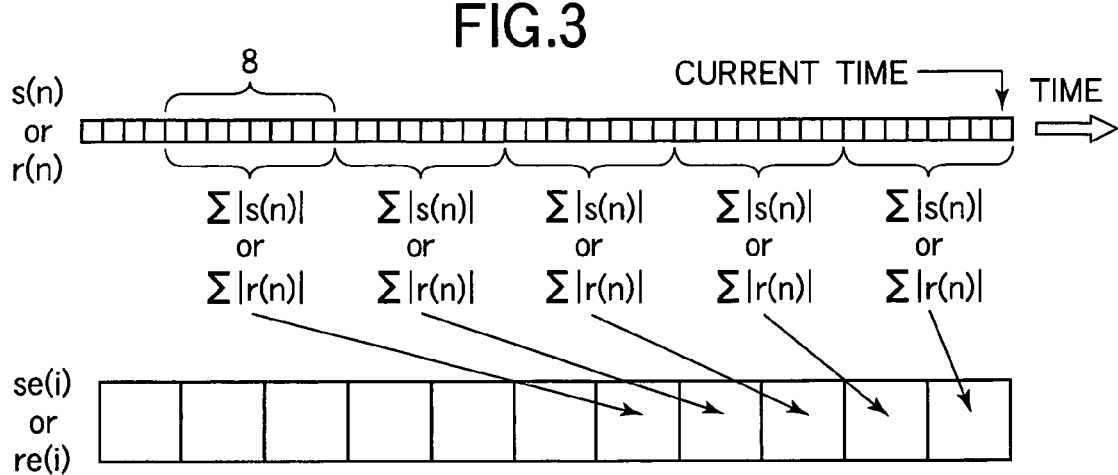
FIG. 3 is a diagram describing an envelope signal calculated by the time-characteristics analysis judgment circuit in the first embodiment.

A range (time length) of the total sum ($\Sigma$) is denoted by N, which is a predetermined value, for example, a value of 8. If a large value is set to N, a change of the envelope signal is gentle, so that the susceptibility to noise of the envelope signal is reduced and the minute characteristics of the envelope of the absolute value of the speech signal is prevented from being reflected to the envelope. On the other hand, if a small value is set to N, the minute characteristics of the envelope of the absolute value of the speech signal is reflected to the envelope and the susceptibility to noise of the envelope signal is increased. In an example shown in FIG. 3, N is set to a value of 8, but a value of N may be any other value. The range (time length) of the total sum ($\Sigma$) shown in FIG. 3 has no overlapping part, but the range may include an overlapping part.

In the description given above, the sum of the absolute values is used for calculating the envelope signal, but a different expression using any parameter representing the envelope characteristics of the speech signal, such as the sum of squares, may be used.

Figure 4:
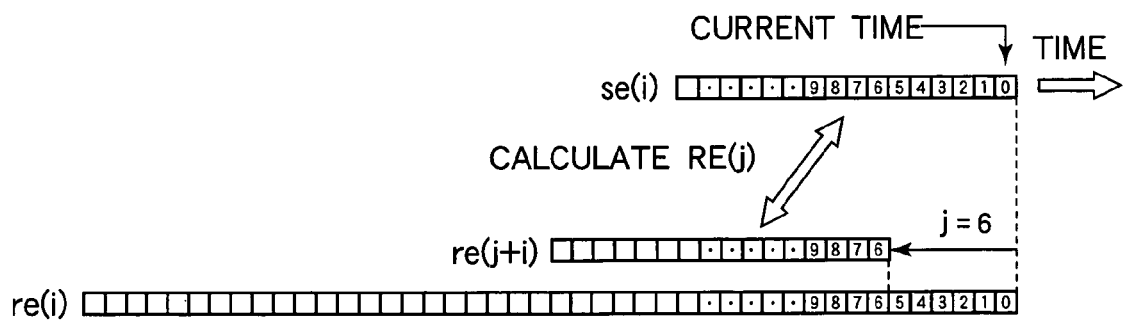
FIG. 4 is a diagram describing a degree of correlation calculated by the time-characteristics analysis judgment circuit in the first embodiment.

The time-characteristics analysis judgment circuit 101 (the time-difference information generator 202 provided therein) calculates the degree of correlation RE(j) between a signal re(i+j) delayed by adding a time-difference j to the receiving-speech envelope signal re(i) and the sending-speech envelope signal se(i), in accordance with the equation (3), and outputs the time-difference j=D at the highest degree of correlation RE(j) as time-difference information (the initial delay time of the adaptive filter in the pseudo echo generation circuit 102). FIG. 4 is a diagram showing the relationship between the two signals provided to calculate the degree of correlation RE(j), when j is a value of 6.

$$RE(j) = (\Sigma(se(i) \times re(i+j)))^2 \div \Sigma(re(i+j) \times re(i+j)) \quad (3)$$

The method of calculating the degree of correlation RE(j) is not limited to that given by the equation (3), and any method of calculating a degree of similarity between the receiving-speech envelope signal re(i) and the sending-speech envelope signal se(i) may be used.

Further, the calculation of the time-difference information D by the time-characteristics analysis judgment circuit 101 may be performed at arbitrary intervals. For example, the time-difference information D may be calculated at intervals of 10 ms.

The time-characteristics analysis judgment circuit 101 (an update information generator 203 provided therein) calculates an echo signal power PSD, a reference signal power PRD, a degree of correlation RD, and an echo path loss AE, in accordance with the sending-speech signal s(n), the receiving-speech signal r(n), and the time-difference information D (an initial delay time D×N), and subsequently judges whether the tap coefficients should be updated or not. The echo signal power PSD, the reference signal power PRD, the degree of correlation RD, and the echo path loss AE are calculated in accordance with equations (4) to (7) respectively, in consideration of a single talk state, where just the receiving-speech signal r(n), not the sending-speech signal s(n), includes a valid audio signal. In the single talk state, as described above, most of the power of the sending-speech signal s(n) is composed of echo components.

$$PSD = \sum (s(n) \times s(n)) \quad (4)$$

$$PRD = \sum (r(n + D \times N) \times r(n + D \times N)) \quad (5)$$

$$RD = \sum \frac{s(n) \times r(n + D \times N)}{\sqrt{PSD} / \sqrt{PRD}} \quad (6)$$

$$AE = 10 \times \log_{10}(PRD / PSD) \quad (7)$$

A range (time length) of the total sum (z) in each of the equations (4) to (6) is denoted by M, which is a predetermined value, for example, a value of 160.

As clearly indicated by the equations (4) and (5), the echo signal power PSD and the reference signal power PRD are calculated from the sending-speech signal and the receiving-speech signal at a timing differing by the initial delay time D×N and reflect immediately the time-difference information D updated in a predetermined cycle (e.g., an interval of 10 ms). The echo path loss AE, which is the logarithm of the ratio between the echo signal power PSD and the reference signal power PRD, also reflects immediately the time-difference information D updated in a predetermined cycle (e.g., an interval of 10 ms). As clearly indicated by the equation (7), the degree of correlation RD between the sending-speech signal s(n) and the receiving-speech signal r(n) is obtained by reflecting immediately the time-difference information D updated in a predetermined cycle (e.g., an interval of 10 ms).

If the three following conditions C1 to C3 are all satisfied, the time-characteristics analysis judgment circuit 101 (an update information generator 203 provided therein) outputs the update information ASW of "execution of updating (e.g., a value of 1)" and, otherwise, outputs the update information ASW of "suspension of updating (e.g., a value of 0)".

The condition C1 is PRD>PTHD, where PTHD is a predetermined reference value.

The condition C2 is RD>RTHD, where RTHD is a predetermined reference value.

The condition C3 is AE>ATHD, where ATHD is a predetermined reference value.

While the update of the tap coefficients is controlled in accordance with the conditions C1 to C3, the time-difference information D updated in a predetermined cycle (e.g., an interval of 10 ms) is used, so that the pseudo echo generation circuit 102 can perform the echo cancellation operation to allow the echo to be cancelled immediately and appropriately even if just the delay time of the echo path changes, as mentioned as one problem of the conventional art. If the operation of the sound device incorporated in the PC causes the initial delay time of the echo path to change, for example, the operation to update the tap coefficients can be executed immediately to cancel the echo appropriately.

If the condition C1 given above is satisfied, it is judged that the power of the receiving-speech signal r(n), which becomes a source of an acoustic echo, is present. If the condition C2 is satisfied, it is judged that the degree of correlation between the sending-speech signal s(n) and the receiving-speech signal r(n) is high (i.e., a major component of the sending-speech signal s(n) is an echo component). If the condition C3 is satisfied, it is judged that the amount of signal going from the speaker, not shown, to the microphone, not shown, is within the assumed range of the path loss. If these three conditions C1 to C3 are satisfied, it is judged that most of the power of the sending-speech signal s(n) comes from an echo caused by the receiving-speech signal r(n). In this case, the update information ASW is set to "execution of updating".

Further, the reasons of suspension of updating of the tap coefficients in accordance with the conditions C1 to C3 substantially includes the conventional reasons of suspension of updating of the tap coefficients.

For example, if the sending-speech signal s(n) includes a speech signal component of the voice of a person on the sending-side (e.g., a double talk state), a ratio of the echo component in the sending-speech signal s(n) is small, and therefore it is determined that there is no correlation between the sending-speech signal s(n) and the receiving-speech signal r(n). In other words, it is determined that the condition C2 is not satisfied. In this case, if the tap coefficients h(k) of the adaptive filter in the pseudo echo generation circuit 102 is updated, the tap coefficients h(k) would be destroyed. Therefore, if the condition C2 is not satisfied as described above, the update information ASW of "suspension of updating" is set to prevent the tap coefficients h(k) from being destroyed.

Furthermore, the judgment criteria PTHD, RTHD, and ATHD of the conditions C1 to C3 can be set to, for example, a value of 50,000,000, a value of 0.9, and a value of 20 respectively, but the criteria may be other values set appropriately.

In the description given above, if the conditions C1 to C3 are all satisfied, the update information ASW of "execution of updating" is outputted from the time-characteristics analysis judgment circuit 101. In addition, if it is known that the condition C3 is always satisfied, for example, if it is known in advance that the acoustic coupling between the microphone, not shown, and the speaker, not shown, is always sufficient, the update information ASW of "execution of updating" may be set when it is judged that both the condition C1 and the condition C2 are satisfied.

Moreover, the update information ASW of "execution of updating" may be set when it is judged that other condition or conditions are satisfied, such as when it is judged that one or any combination of the conditions C1 to C3 is satisfied, depending on the requirements set at the apparatus design.

The operation of the pseudo echo generation circuit 102 and the adder 103 will next be described briefly.

The pseudo echo generation circuit 102 outputs a pseudo echo signal rp(n) calculated through convolution ($\Sigma h(k) \times r(n)$) of the tap coefficients h(k) and the receiving-speech signal r(n). The pseudo echo generation circuit 102 sets the valid range of the tap coefficients h(k) to a predetermined tap length P determined in accordance with the time-difference information D supplied from the time-characteristics analysis judgment circuit 101, and executes the convolution.

Figure 5:
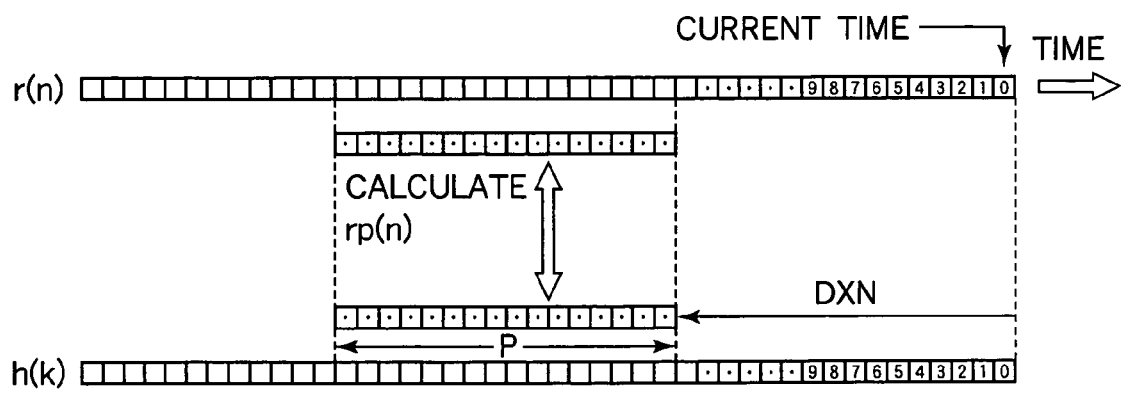
FIG. 5 is a diagram describing a signal part offered to convolution of a pseudo echo generation circuit in the first embodiment.

FIG. 5 is a diagram describing a range of the tap coefficients h(k) and a range of the receiving-speech signal r(n) used for the convolution for generating the pseudo echo signal rp(n). The receiving-speech signal of the tap length P, which ranges from the receiving-speech signal r(0+D×N) at D×N before the current time (a current time is expressed by a value of 0, and a past time is expressed by a positive value) to the receiving-speech signal r(0+D×N+P) at a period equivalent to the tap length P before, or the receiving-speech signal r(0+D×N) to r(0+D×N+P), is used in the convolution for generating the pseudo echo signal rp(0) at the current time.

If the update information ASW of "execution of updating" is received, the pseudo echo generation circuit 102 updates the tap coefficients h(k) by a known tap-coefficient update algorithm such as the LMS algorithm or the normalized LMS algorithm. If the update information ASW of "suspension of updating" is received, only the generation of the pseudo echo signal rp(0) mentioned above is performed.

The adder 103 subtracts the pseudo echo signal rp(n) from the sending-speech signal s(n), thereby obtaining an echo-cancelled sending-speech signal so(n).

Further, the pseudo echo generation circuit 102 may store the preceding time-difference information D0, and compare the preceding time-difference information D0 with the current time-difference information D to check whether there is a change (i.e., whether the initial delay time D×N of the echo path has changed). If there is a change, the pseudo echo generation circuit 102 may perform processing such as resetting the tap coefficients or attenuating the values of the tap coefficients uniformly.

(A-3) Effects of First Embodiment

According to the first embodiment, information needed for the echo cancellation operation (initial delay time, and execution or suspension of updating of the tap coefficients) can be obtained repeatedly at short intervals by using the time correlation between the receiving-speech signal and the sending-speech signal, and a sudden change in characteristics of the echo path can be handled in real time.

Further, the advantages described above can be provided just by an internal modification of the echo canceller. In other words, the advantage of responding to a sudden change in characteristics of the echo path in real time can be provided without changing the hardware of the apparatus incorporating the echo canceller.

(B) Second Embodiment

An echo canceller of the second embodiment of the present invention will be described below with emphasis put on differences from the first embodiment.

In the first embodiment described above, if the sending-speech signal s(n) includes a near-end voice signal and the receiving-speech signal r(n) includes a far-end voice signal, the degree of correlation between the sending-speech signal s(n) and the receiving-speech signal r(n) might become rarely accidentally high, when both speaking persons have a similar voice quality or a similar manner of speaking. If the conditions C1 to C3 are satisfied by chance, the tap coefficients could be updated to degrade the performance of the echo canceller function.

An abrupt change in time-difference information D calculated in accordance with the degree of correlation can be observed in the following two major cases. (1) is a case when the characteristics of the echo path have been changed, and (2) is a case when the speaker signal (including other effective components such as an acoustic signal) used to be included just in the receiving-speech signal is included also in the sending-speech signal. In the case of (2) (i.e., when the state is changed to the so-called double talk state), since a time correlation is sought between the signals that have no time correlation, the obtained time-difference information D keeps changing suddenly while a non-echo signal is included. This may rarely increase the degree of correlation (RD), providing wrong update information ASW. The wrong update information may result in a fault in generation of the pseudo echo signal, which consequently makes it impossible to cancel the echo appropriately. The echo canceller of the second embodiment is provided to prevent these problems from occurring.

An echo canceller 100A of the second embodiment has the same entire configuration as that shown in the functional block diagram of FIG. 1, and includes a time-characteristics analysis judgment circuit 101A, a pseudo echo generation circuit 102, and an adder 103.

However, the detailed configuration of the time-characteristics analysis judgment circuit 101A differs from that in the first embodiment.

FIG. 6 is a block diagram showing the functional detailed configuration of the time-characteristics analysis judgment circuit 101A of the second embodiment. In FIG. 6, constituent elements which are the same as or correspond to those of the first embodiment shown in FIG. 2 are assigned the same or corresponding symbols.

Referring to FIG. 6, the time-characteristics analysis judgment circuit 101A of the second embodiment includes a sending-speech envelope calculator 200, a receiving-speech envelope calculator 201, a time-difference information generator 202, an update information generator 203A, and a time-difference information corrector 204.

The sending-speech envelope calculator 200, the receiving-speech envelope calculator 201, and the time-difference information generator 202 are the same as those in the first embodiment.

The time-difference information corrector 204 corrects the time-difference information D generated by the time-difference information generator 202 in accordance with the equation (8) and outputs the corrected time-difference information DM.

$$DM = \alpha \times DMD + (1-\alpha) \times D \quad (8)$$

where DMD is corrected time-difference information DM obtained at the preceding processing timing, and $\alpha$ is a predetermined value in the range of $0<\alpha<1$. Accordingly, the correcting equation given by the equation (8) provides the weighted addition of the preceding corrected time-difference information DM and the current time-difference information D as corrected time-difference information DM.

A correction equation other than the equation (8) may be used as far as the time-difference information D can be changed (corrected) smoothly.

The update information generator 203A of the second embodiment executes a function of generating the update information ASW in a similar manner to that executed in the first embodiment, by using the corrected time-difference information DM instead of the time-difference information D.

The second embodiment provides nearly the same advantages as the first embodiment. According to the second embodiment, even if a sudden change in time-difference information D occurs consecutively, a fault in update information (ASW) is reduced because the degree of correlation (RD) is calculated by using the time-difference information DM corrected to ease the change. Consequently, a fault in generation of the pseudo echo can be reduced. The change in echo characteristics is handled slower than in the first embodiment, but this delay will cause a little degradation, and the advantages described above are much greater.

(C) Third Embodiment

Next, an echo canceller of the third embodiment of the present invention will be described below with emphasis put on differences from the first embodiment.

In the first embodiment described above, the time-difference information D outputted from the time-characteristics analysis judgment circuit 101 may change a little because of a temporal change in the correlation, a calculation error, or the like, depending on the conditions of echo and background noise (e.g., a power ratio between the echo and noise changing every moment, the initial delay time, and the correlation between echo and noise), even if the echo characteristics (initial delay time) are constant. The time-difference information D outputted from the time-characteristics analysis judgment circuit 101 should be constant without those changes. If the generation of a pseudo echo follows the small change, an event that the echo cannot be cancelled appropriately occurs. The echo canceller of the third embodiment is provided to prevent this problem from occurring.

FIG. 7 is a block diagram showing a configuration of the echo canceller of the third embodiment. In FIG. 7, constituent elements which are the same as or correspond to those of the first embodiment shown in FIG. 1 are assigned the same or corresponding symbols.

Referring to FIG. 7, an echo canceller 100B of the third embodiment includes a time-characteristics analysis judgment circuit 101, a pseudo echo generation circuit 102B, an adder 103, and a delay adjustment circuit 104.

The delay adjustment circuit 104 corrects the time-difference information D outputted from the time-characteristics analysis judgment circuit 101 in accordance with the equation (9) given below, and outputs the corrected time-difference information DMQ to the pseudo echo generation circuit 102B.

$$DMQ = INT(D/Q) \times Q \quad (9)$$

In the equation (9), INT(D/Q) represents a function for extracting an integer part of a value D/Q. Q is a predetermined positive integer, e.g., a value of 10 (not limited to this value). If the value of the time-difference information D is 123 and the value of Q is 10, for example, a value of the corrected time-difference information DMQ obtained through the calculation in accordance with the equation (9) is 120.

The pseudo echo generation circuit 102B of the third embodiment executes the same function as the pseudo echo generation circuit 102 of the first embodiment, by using the corrected time-difference information DMQ instead of the time-difference information D.

The third embodiment has the same advantages as the first embodiment. According to the third embodiment, even if the time-difference information D changes a little in accordance with the relationship between background noise and echo or the like, the small change is eliminated from the corrected time-difference information DMQ. Consequently, the operation to cancel the echo can be performed appropriately.

The technical idea of the third embodiment can be combined with not only the technical idea of the first embodiment but also the technical idea of the second embodiment.

(D) Fourth Embodiment

An echo canceller of the fourth embodiment of the present invention will be described below with emphasis put on differences from the first embodiment.

According to the first embodiment, it takes time to converge the tap coefficients of the adaptive filter in the pseudo echo generation circuit 102, so that the tap coefficients may not be updated to the one corresponding to the echo path having new time-difference information D at the moment when the time-difference information D changes. An effective pseudo echo cannot be generated for a while after the time-difference information D changes, causing an unusual sound to be perceived. The echo canceller of the fourth embodiment is provided to prevent this problem from occurring.

An echo canceller 100C of the fourth embodiment also has an entire configuration as shown in the functional block diagram of FIG. 1, and includes a time-characteristics analysis judgment circuit 101, a pseudo echo generation circuit 102C, and an adder 103.

Figure 8:
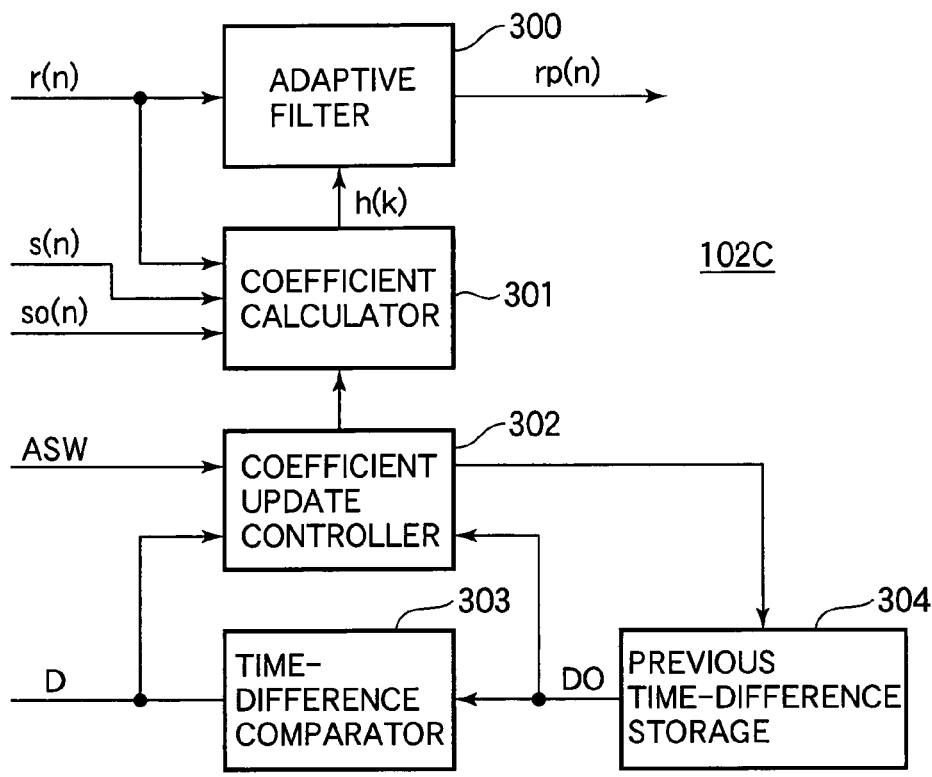
FIG. 8 is a block diagram showing a detailed configuration of a pseudo echo generation circuit in the fourth embodiment.

The function of the pseudo echo generation circuit 102C, however, differs from that in the first embodiment in some degree. FIG. 8 is a block diagram showing a functional detailed configuration of the pseudo echo generation circuit 102C of the fourth embodiment.

Referring to FIG. 8, the pseudo echo generation circuit 102C includes an adaptive filter 300, a coefficient calculator 301, a coefficient update controller 302, a time-difference comparator 303, and a previous time-difference storage 304.

The adaptive filter 300 convolutes the receiving-speech signal r(n) and the tap coefficients h(k), thereby generating a pseudo echo signal rp(n).

The coefficient calculator 301 updates the tap coefficients h(k) in accordance with a predetermined algorithm.

The coefficient update controller 302 controls execution or suspension of updating of the tap coefficients h(k) by the coefficient calculator 301 and supplies a time parameter needed for execution of updating to the coefficient calculator 301. The coefficient update controller 302 differs from a general pseudo echo generation circuit in that it references a result of comparison made by the time-difference comparator 303 and controls execution or suspension of updating of the tap coefficients h(k) or changes a parameter.

The previous time-difference storage 304 stores the time-difference information D supplied by the coefficient update controller 302 for update control at a next operation time. Viewed from the new operation time, the time-difference information D0 stored in the previous time-difference storage 304 is the time-difference information received at the preceding operation time.

When the current operation time is updated (to a new operation time), the time-difference comparator 303 compares the time-difference information D received at the current operation time and the time-difference information D0 at the preceding operation time, stored in the previous time-difference storage 304, and supplies a result of comparison to the coefficient update controller 302.

The control operation by the coefficient update controller 302 will be described below in detail for each combination of the result of comparison and the update information ASW.

If the time-difference comparator 303 finds agreement as a result of comparison, the coefficient update controller 302 performs the control operation as described in the first embodiment, in accordance with the received update information ASW.

On the other hand, if the time-difference information D at the current operation time supplied by the time-characteristics analysis judgment circuit 101 differs from the time-difference information D0 at the preceding operation time, the operation of the coefficient update controller 302 depends on the update information ASW, as described below.

If the update information ASW of "suspension of updating" is received, the coefficient update controller 302 causes the tap coefficients h(k) based on the time-difference D0 supplied by the coefficient calculator 301 at the preceding operation time to be held, and causes the adaptive filter 300 to output the pseudo echo signal rp(n) generated through convolution of the tap coefficients h(k) based on the time-difference D0 at the preceding operation time and the receiving-speech signal r(n). The coefficient update controller 302 holds the time-difference information D at the current operation time in the previous time-difference storage 304 for the next operation time.

If the update information ASW of "execution of updating" is received, the coefficient update controller 302 directs the coefficient calculator 301 to start updating the tap coefficients h(k) based on the time-difference information D at the current operation time, going back the time T. While the tap coefficients of a past signal is being updated, the coefficient update controller 302 inhibits the coefficient calculator 301 from transferring tap coefficients to the adaptive filter 300, suppressing the generation of the pseudo echo signal rp(n).

If the time-difference information D (or the initial delay time D×N of the echo path) changes, as described above, processing such as resetting the tap coefficients or attenuating the values of the tap coefficients uniformly may also be performed immediately before an update of the tap coefficients starts.

The coefficient update controller 302 allows the execution of updating of the tap coefficients to be continued until the signal at the current operation time is processed within the period of the current operation time, and, when the tap coefficients for the signal at the current operation time is updated, generates the pseudo echo signal rp(n). The coefficient update controller 302 holds the time-difference information D at the current operation time in the previous time-difference storage 304 for the next operation time even if the update information ASW of "execution of updating" is received.

As has been described above, if the time-difference information D (or the initial delay time D×N of the echo path) changes, the coefficient is updated by using a past sending-speech signal and a past receiving-speech signal corresponding to the post-change initial delay, and then the pseudo echo signal at the current operation time is generated and the coefficient is updated, with reference to the post-change time-difference information D.

According to the fourth embodiment, the following advantages can be provided in addition to the advantages of the first embodiment. The tap coefficients can be updated in advance for the new time-difference information D, and when a pseudo echo signal is generated actually, the pseudo echo signal can be generated in a state where the tap coefficients have already been updated to some extent. As a result, the sudden perception of an unusual sound can be relieved even if the time-difference information changes.

The technical idea of the fourth embodiment can be combined with not only the technical idea of the first embodiment but also the technical idea of the second or third embodiment.

(E) Fifth Embodiment

An echo canceller of the fifth embodiment of the present invention will be described below with emphasis put on differences from the first embodiment.

In the first embodiment, when there is a very small echo or no echo, the signals of voices of the speaking persons may rarely increase the degree of correlation (RD) for a while, and consequently the time-characteristics analysis judgment circuit 101 might misjudge that the echo path has been changed and might set inadequate update information (ASW) of "execution of updating". If a pseudo echo signal is generated in accordance with the update information (ASW), the pseudo echo generation circuit 102 would update the tap coefficients of the adaptive filter in accordance with the signals of voices of the speaking persons in a moment and would infer an inadequate echo path. The subsequent pseudo echo signals would be generated in accordance with the inadequate tap coefficients. The inadequate update information ASW generated in accordance with a rare increase in degree of correlation (RD) because of the signals of voices of the speaking persons would cause a fault in generation of the pseudo echo signal, consequently making it impossible to cancel the echo appropriately. In the second embodiment, which is provided to avoid the same type of problem, inadequate update information ASW may still be generated. The echo canceller of the fifth embodiment is provided to prevent the problem from occurring.

Figure 9:
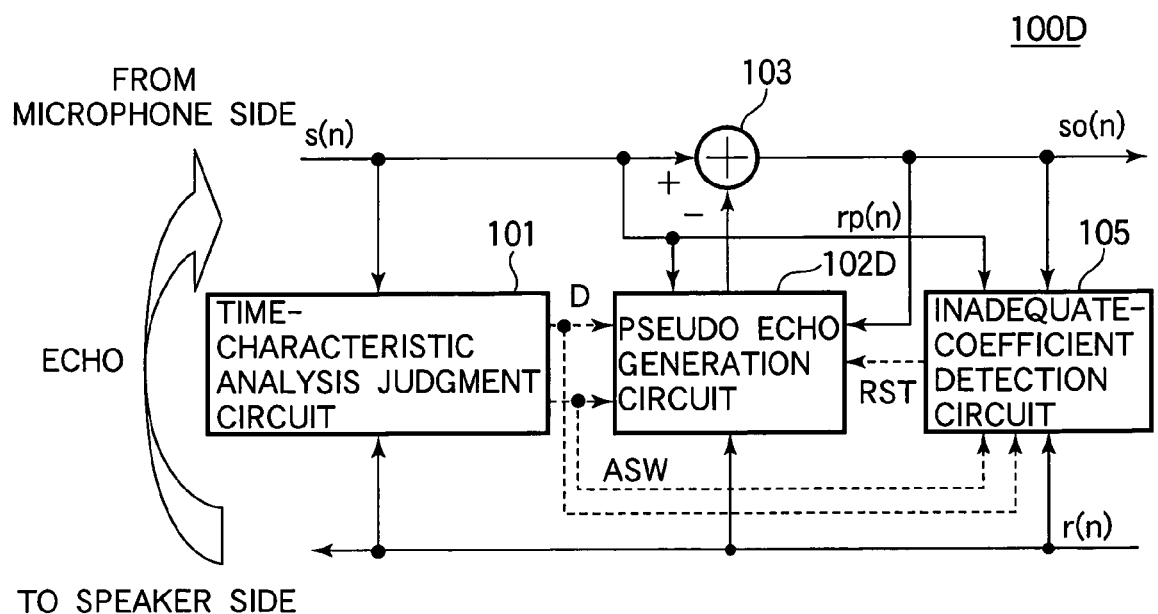
FIG. 9 is a block diagram showing a configuration of an echo canceller of the fifth embodiment.

FIG. 9 is a block diagram showing a configuration of the echo canceller of the fifth embodiment. In FIG. 9, constituent elements which are the same as or correspond to those of the first embodiment shown in FIG. 1 are assigned the same or corresponding symbols.

Referring to FIG. 9, an echo canceller 100D of the fifth embodiment includes a time-characteristics analysis judgment circuit 101, a pseudo echo generation circuit 102D, an adder 103, and an inadequate-coefficient detection circuit 105.

The inadequate-coefficient detection circuit 105 calculates an echo signal power PSD, a reference signal power PRD, a residual signal power POD, and an amount of echo cancellation AC in accordance with equations (10) to (13) respectively. The echo signal power PSD and the reference signal power PRD calculated by the time-characteristics analysis judgment circuit 101 may be used.

$$PSD = \Sigma(s(n) \times s(n)) \quad (10)$$

$$PRD = \Sigma(r(n+D \times N) \times r(n+D \times N)) \quad (11)$$

$$POD = \Sigma(so(n) \times so(n)) \quad (12)$$

$$AC = 10 \times \log_{10}(PSD/POD) \quad (13)$$

In the equations (10) to (12), a range (time length) of the total sum ($\Sigma$) is set to M, which is a predetermined value, e.g., a value of 160, but is not limited to this value.

If the following three conditions R1 to R3 are all satisfied, the inadequate-coefficient detection circuit 105 outputs tap coefficient initialization information RST of "initializing the tap coefficients" (e.g., a value of 1) to the pseudo echo generation circuit 102D. Otherwise, the circuit outputs the information of "not initializing the tap coefficients" (e.g., a value of 0).

The condition R1 is PRD<PTHDR, where PTHDR is a predetermined reference value.

The condition R2 is ASW is "suspension of updating".

The condition R3 is AC<ATHDR, where ATHDR is a predetermined reference value.

The reference values PTHDR and ATHDR can be set to values of 50,000,000 and 0 respectively, for example. These values can be set to other values suitably.

While a power of the receiving-speech signal is weak, the time-characteristics analysis judgment circuit 101 is likely to form a misjudgment. The situation in which an error is likely to be made can be found by the condition R1. Since the problem is the continued existence of wrong tap coefficients, the condition R2 for maintaining the tap coefficients also becomes a condition for initializing the tap coefficients. The update information ASW can be regarded as information indicating a state of receiving-speech or sending-speech. The amount of echo cancellation AC is likely to be small when the tap coefficients are wrong, and this can be found by the condition R3.

If the tap coefficient initialization information RST of "initializing the tap coefficients" is received, the pseudo echo generation circuit 102D of the fifth embodiment initializes the internal tap coefficients h(k).

The fifth embodiment provides the following advantages in addition to the advantages of the first embodiment. When a pseudo echo signal is generated, the signal provided to cancel an echo would conversely increase the echo if the signals of voice of the speaking persons temporarily increase the degree of correlation (RD). In the fifth embodiment, this type of problem can be detected and resolved.

The technical idea of the fifth embodiment can be combined with not only the technical idea of the first embodiment but also the technical idea of the second, third, or fourth embodiment.

(F) Sixth Embodiment

An echo canceller of the sixth embodiment of the present invention will next be described below with emphasis put on differences from the first embodiment.

In the first embodiment, if the ambient noise environment of the microphone input side is poor, the echo signal could be affected by noise even if a person on the sending-speech side is not speaking, which would decrease the degree of correlation with the receiving-speech signal. This provides wrong update information ASW ("suspension of updating" instead of "execution of updating"), making it impossible to cancel the echo appropriately. The echo canceller of the sixth embodiment is provided to prevent this problem from occurring.

Figure 10:
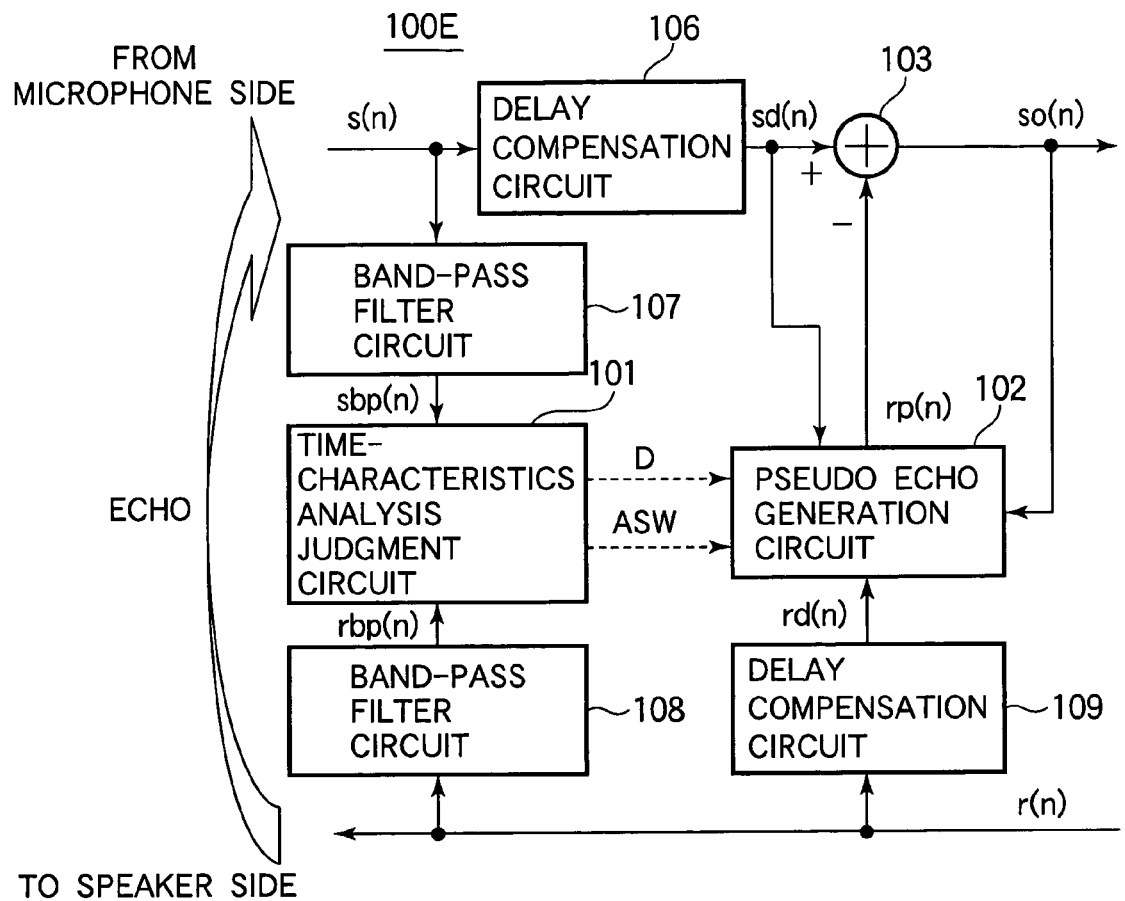
FIG. 10 is a block diagram showing a configuration of an echo canceller of the sixth embodiment.

FIG. 10 is a block diagram showing a configuration of the echo canceller of the sixth embodiment. In FIG. 10, constituent elements which are the same as or correspond to those of the first embodiment shown in FIG. 1 are assigned the same or corresponding symbols.

Referring to FIG. 10, an echo canceller 100E of the sixth embodiment includes a time-characteristics analysis judgment circuit 101, a pseudo echo generation circuit 102, an adder 103, two band-pass filter circuits 107 and 108, and two delay compensation circuits 106 and 109. The time-characteristics analysis judgment circuit 101, the pseudo echo generation circuit 102, and the adder 103 are the same as those in the first embodiment.

The band-pass filter circuit 107 passes the sending-speech signal s(n) in a predetermined band and supplies a filtered sending-speech signal sbp(n) to the time-characteristics analysis judgment circuit 101.

The band-pass filter circuit 108 passes the receiving-speech signal r(n) in a predetermined band and supplies a filtered receiving-speech signal rbp(n) to the time-characteristics analysis judgment circuit 101. The pass band of the band-pass filter circuit 108 is the same as the pass band of the band-pass filter circuit 107.

The delay compensation circuit 106 delays the sending-speech signal s(n) by a processing delay time of the band-pass filter circuit 107 and supplies a delayed sending-speech signal sd(n) to the pseudo echo generation circuit 102 and the adder 103.

The delay compensation circuit 109 delays the receiving-speech signal r(n) by a processing delay time of the band-pass filter circuit 108 and supplies a delayed receiving-speech signal rd(n) to the pseudo echo generation circuit 102.

The pass bands of the band-pass filter circuits 107 and 108 are set to 300 to 3000 Hz, for example.

FIG. 10 is a diagram describing a reason for disposing the band-pass filter circuits 107 and 108. Generally, noise frequency components (N) have flat strength characteristics (e.g., power). The frequency components of a voice uttered by a person have mountain-shaped characteristics, and an echo signal of the sending-speech signal coming from the receiving-speech signal has the same characteristic. The frequency components of a voice uttered by a person have a very large strength in the range of 300 to 3000 Hz, for example. This means that the S/N ratio (where S denotes an echo signal and N denotes an ambient noise) is sufficient in the range of 300 to 3000 Hz. The S/N ratio is low in the other band.

The analysis accuracy of the time-characteristics analysis judgment circuit 101 can be improved by using the sending-speech signal s(n) having a good S/N ratio.

The sixth embodiment provides the following advantages in addition to the advantages of the first embodiment. Since the time-characteristics analysis judgment circuit 101 uses a frequency band where the speech signal power is large, the analysis and judgment can be made while the S/N ratio is comparatively high, so that an error in judgment of updating the tap coefficients can be reduced.

The sixth embodiment considers the presence of background noise at a near end, so that the band-pass filter circuit 108 and the delay compensation circuit 109 provided in a system for processing the receiving-speech signal may be omitted.

The technical idea of the sixth embodiment may be combined with not only the technical idea of the first embodiment singly but also one or more technical ideas of the first to fifth embodiments.

(G) Seventh Embodiment

An echo canceller of the seventh embodiment of the present invention will be described below with emphasis put on differences from the sixth embodiment.

Figure 11:
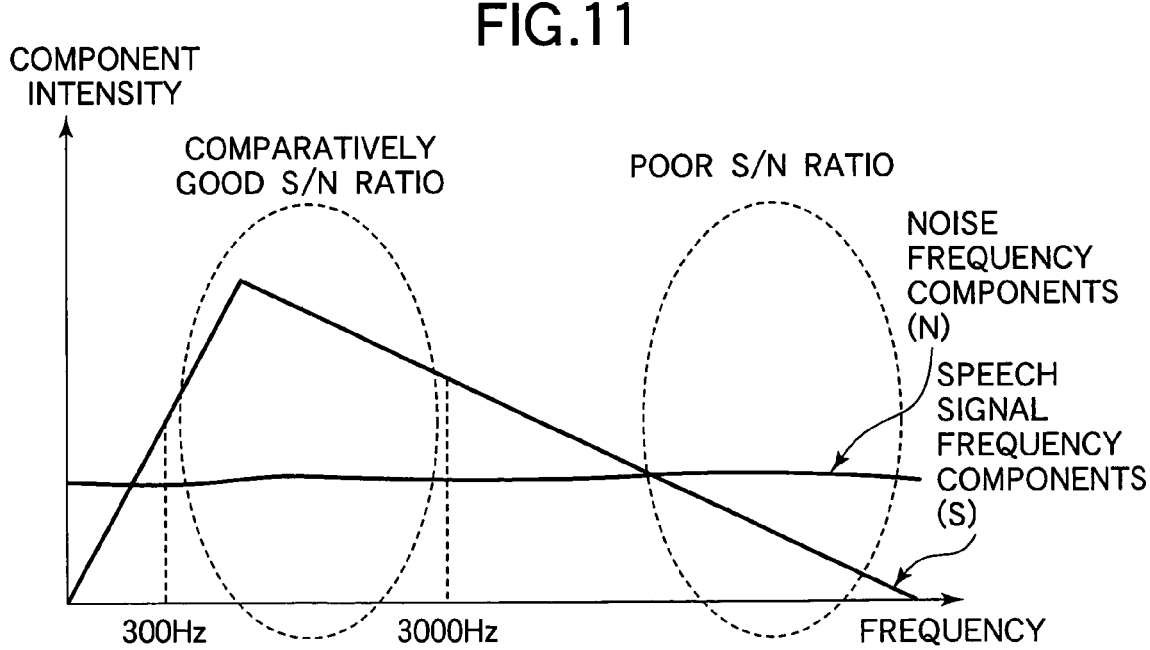
FIG. 11 is a diagram describing a reason for providing a band-pass filter circuit in the sixth embodiment.

The pseudo echo generation circuit 102 of the sixth embodiment operates using the sending-speech signal and the receiving-speech signal, which do not pass the band-pass filter circuits 107 and 108. As has been described with reference to FIG. 11, the frequency components of the speech signal have a frequency band where power is concentrated (hereinafter referred to as a concentrated band). On the other hand, power components in a band other than the power concentrated band is relatively small. The frequency components outside the power concentrated band are components that are originally hard to be perceived as an echo. The tap coefficients h(k) of the pseudo echo generation circuit 102 are provided to simulate the transfer characteristics of the echo path. When the simulation taking the entire frequency band into consideration is compared with the simulation taking a partial frequency band into consideration, the latter is more accurate if the tap length P is the same. This means that the generated pseudo echo signal is more suitable to the target frequency band. In view of the foregoing, the echo canceller of the seventh embodiment is provided.

Figure 12:
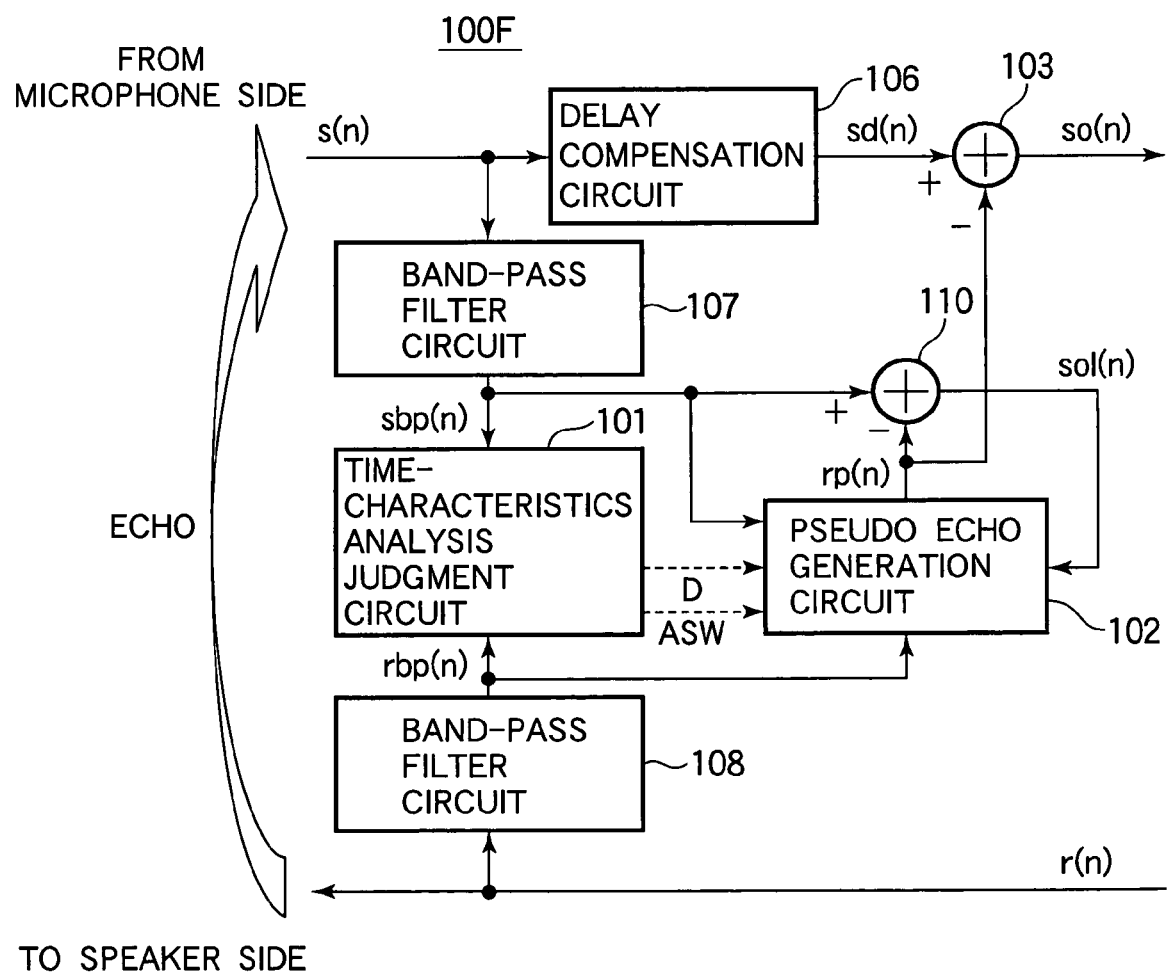
FIG. 12 is a block diagram showing a configuration of an echo canceller of the seventh embodiment.

FIG. 12 is a block diagram showing a configuration of the echo canceller of the seventh embodiment. In FIG. 12, constituent elements which are the same as or correspond to those of the sixth embodiment shown in FIG. 10 are assigned the same or corresponding symbols.

Referring to FIG. 12, an echo canceller 100F of the seventh embodiment includes a time-characteristics analysis judgment circuit 101, a pseudo echo generation circuit 102, an adder 103, two band-pass filter circuits 107 and 108, a delay compensation circuit 106, and an adder 110.

The time-characteristics analysis judgment circuit 101, the pseudo echo generation circuit 102, the adder 103, the two band-pass filter circuits 107 and 108, and the delay compensation circuit 106 are the same as those in the sixth embodiment.

In the seventh embodiment, the pseudo echo generation circuit 102 generates a pseudo echo signal rp(n) in accordance with the sending-speech signal sbp(n) and the receiving-speech signal rbp(n), which have passed through the band-pass filter circuits 107 and 108.

The adder 103 removes the pseudo echo signal rp(n) from the sending-speech signal sd(n) which has passed the delay compensation circuit 106 and outputs an echo-cancelled sending-speech signal so(n), in the similar manner to the sixth embodiment.

The echo-cancelled sending-speech signal so(n) is fed back to the pseudo echo generation circuit 102 for evaluation of the echo cancellation characteristics, as has been described in the above-mentioned embodiments or as in general cases. In the seventh embodiment, the pseudo echo generation circuit 102 receives the sending-speech signal sbp(n) and the receiving-speech signal rbp(n), which have passed through the band-pass filter circuits 107 and 108. The frequency band of the echo-cancelled sending-speech signal so(n) outputted from the adder 103 differs from those of the sending-speech signal sbp(n) and the receiving-speech signal rbp(n) inputted to the pseudo echo generation circuit 102.

Accordingly, a dummy adder 110 is provided to eliminate the pseudo echo signal rp(n) from the sending-speech signal sbp(n) coming from the band-pass filter circuit 107, and the echo-cancelled sending-speech signal sol(n) from the dummy adder 110 is fed back to the pseudo echo generation circuit 102, so that all the signals inputted to the pseudo echo generation circuit 102 have the same frequency band.

The seventh embodiment provides the following advantages in addition to the advantages of the first embodiment. Since the time-characteristics analysis judgment circuit 101 uses the concentrated band where the speech signal power is large, the analysis and judgment can be made with a comparatively high S/N ratio, so that an error in judgment of updating the tap coefficients can be reduced. The echo components outside the power concentrated band are not cancelled, but the capability of cancelling echo components in the power concentrated band can be improved greatly. The echo components outside the power concentrated band do not have a great influence, and the echo cancellation capability can be improved on the whole.

The technical idea of the seventh embodiment can be combined with one or more technical ideas of the first to fifth embodiment.

(H) Eighth Embodiment

An echo canceller of the eighth embodiment of the present invention will be described below with emphasis put on differences from the seventh embodiment.

In the seventh embodiment, echo components outside the power concentrated band, which have a little influence, are not cancelled. In view of the foregoing, the echo canceller of the eighth embodiment is provided to attenuate the echo components outside the power concentrated band.

Referring to FIG. 13, an echo canceller 100G of the eighth embodiment includes a time-characteristics analysis judgment circuit 101, a pseudo echo generation circuit 102, two band-pass filter circuits 107 and 108, a delay compensation circuit 106, an adder 110, an adder 111, an attenuation circuit 112, and an addition circuit 113. The time-characteristics analysis judgment circuit 101, the pseudo echo generation circuit 102, the two band-pass filter circuits 107 and 108, the delay compensation circuit 106, and the adder 110 are the same as those in the seventh embodiment.

The newly provided adder 111 receives a delayed sending-speech signal sd(n) outputted from the delay compensation circuit 106 as a minuend input and a filtered sending-speech signal sbp(n) outputted from the band-pass filter circuit 107 as a subtrahend input. The adder 111 provides a sending-speech signal sdh(n) mainly comprised of components outside the power concentrated band as its output signal and outputs the signal to the newly provided attenuation circuit 112.

The attenuation circuit 112 also receives the update information ASW. If the update information ASW of "execution of updating" is received, the attenuation circuit 112 attenuates the input signal sdh(n) by X dB and outputs a result of the attenuating to the newly provided addition circuit 113. If the update information ASW of "suspension of updating" is received, the circuit outputs the input signal sdh(n) to the addition circuit 113 as it is. X is a predetermined value, e.g., a value of 6, but is not limited to this value.

The addition circuit 113 receives not only an output signal sdhd(n) (attenuated sending-speech signal outside the concentrated band) from the attenuation circuit 112 but also the output signal sol(n) (echo-cancelled sending-speech signal) from the adder 110. As has been described in the seventh embodiment, the output signal sol(n) from the adder 110 is an echo-cancelled sending-speech signal mainly comprised of components of the power concentrated band, and the output signal sdhd(n) from the attenuation circuit 112 is an attenuated sending-speech signal mainly composed of components outside the power concentrated band. Adding the two signals by the adder 113 produces the sending-speech signal so(n) with the echo components of the concentrated band cancelled and the echo components outside the concentrated band attenuated. The sending-speech signal so(n) is sent as an output signal from the echo canceller 100G.

The eighth embodiment provides the following advantages in addition to the advantages of the first embodiment. Since the time-characteristics analysis judgment circuit 101 uses the concentrated band where the speech signal power is large, the analysis and judgment can be made with a comparatively high S/N ratio, so that an error in judgment of updating the tap coefficients can be reduced. In addition, the capability of cancelling the echo components in the power concentrated band can be improved greatly, and the echo components outside the power concentrated band are attenuated, so that the influence can be reduced.

The technical idea of the eighth embodiment can be combined with one or more technical ideas of the first to fifth embodiments.

(I) Other Embodiments

A variety of modified embodiments have been described in the description of the above-mentioned embodiments, and the following modified embodiments can also be given as additional examples.

In the above-mentioned embodiments, a case where the pseudo echo generation circuits 102, 102B, 102C, and 102D change the tap length P of the adaptive filter in accordance with received time-difference information D or DMQ, but the tap length P may be fixed irrespective of the time-difference information D or DMQ. Processing such as resetting the tap coefficients or attenuating the values of the tap coefficients uniformly may also be performed if the delay difference information D or DMQ changes. By setting the tap length P to a fixed value, instead of using a variable tap length, the amount of hardware (the amount of calculation elements, and the amount of memory) or the amount of software processing can be saved.

Further, in the above-mentioned embodiments, a case where the fixed values are adopted (e.g., the judgment criteria) has been described, adjustable values may be used in place of the fixed values.

Furthermore, the echo cancellers of the above-mentioned embodiments are intended for softphone on the PC, but the application of the present invention is not limited to them. The echo canceller can be used for an apparatus where the echo path characteristics (especially the delay characteristics) could change suddenly as well as for an apparatus where the echo path characteristics could change slowly.

What is claimed is:
1. An echo canceller comprising:
a pseudo echo generation means including an adaptive filter, the pseudo echo generation means generating a pseudo echo signal in accordance with a receiving-speech signal;
an echo cancellation means which subtracts the pseudo echo signal from a sending-speech signal, thereby canceling an echo signal from the sending-speech signal;
a smoothed sending-speech signal calculation means which calculates a smoothed sending-speech signal from the sending-speech signal, the smoothed sending-speech signal being obtained by smoothing the sending-speech signal;
a smoothed receiving-speech signal calculation means which calculates a smoothed receiving-speech signal from the receiving-speech signal, the smoothed receiving-speech signal being obtained by smoothing the receiving-speech signal;
a delay time information generation means which obtains delay time information reflecting delay characteristics of an echo path, in accordance with a correlation between the smoothed sending-speech signal and the smoothed receiving-speech signal;
an update information generation means which obtains update information indicating execution of updating of the tap coefficients of the adaptive filter or suspension of updating of the tap coefficients of the adaptive filter, in accordance with the sending-speech signal, the receiving-speech signal, and the delay time information;

a sending-speech band limiting means which limits a frequency band of the sending-speech signal to supply the sending-speech signal having the limited frequency band to the smoothed sending-speech signal calculation means; and a receiving-speech band limiting means which limits a frequency band of the receiving-speech signal to supply the receiving-speech signal having the limited frequency band to the smoothed receiving-speech signal calculation means;

wherein if the update information indicates the execution of updating, the pseudo echo generation means updates the tap coefficients and receives the delay time information as information reflecting the delay characteristics of the echo path to perform processing of the received delay time information; and wherein the pseudo echo generation means generates the pseudo echo signal and updates the tap coefficients by using the sending-speech signal having the frequency band limited by the sending-speech band limiting means and the receiving-speech signal having the frequency band limited by the receiving-speech band limiting means.

2. The echo canceller according to claim 1, wherein the delay time information generation means smoothes the delay time information obtained currently in accordance with the delay time information obtained previously, thereby outputting the smoothed delay time information.

3. The echo canceller according to claim 1, further comprising:

a delay adjustment means which checks which one range of a plurality of ranges having a certain width contains a value of the delay time information outputted from the delay time information generation means, replaces the value of the delay time information with a representative value of the range containing the value of the delay time information, and then supplies the representative value to the pseudo echo generation means.

4. The echo canceller according to claim 1, wherein the pseudo echo generation means changes a tap length which is number of the tap coefficients used for generating the pseudo echo signal, in accordance with the delay time information.

5. The echo canceller according to claim 1, wherein if the value of the received delay time information changes, the pseudo echo generation means performs any of initialization of the tap coefficients and attenuation processing of the tap coefficients.

6. The echo canceller according to claim 1, wherein if the value of the received delay time information changes, the pseudo echo generation means updates the tap coefficients by using the sending-speech signal sent previously and the receiving-speech signal received previously corresponding to the changed delay time information, generates the pseudo echo signal at current time with reference to the changed delay time information, and updates the tap coefficients with reference to the changed delay time information.

7. The echo canceller according to claim 1, further comprising:

an inadequate-coefficient detection means which judges whether or not the tap coefficients are inadequate, from a state of the receiving-speech and the sending-speech, a power of the receiving-speech signal, and amount of echo cancellation;

wherein if the inadequate-coefficient detection means judges that the tap coefficients are inadequate, the pseudo echo generation means performs initialization of the tap coefficients.

8. The echo canceller according to claim 1, wherein the echo cancellation means comprises:

a first adder which subtracts the sending-speech signal having the frequency band limited by the sending-speech band limiting means, from the sending-speech signal;

an attenuator which attenuates an output signal from the first adder, if the update information indicates the execution of updating;

a second adder which subtracts the pseudo echo signal outputted from the pseudo echo generation means from the sending-speech signal having the frequency band limited by the sending-speech band limiting means; and a third adder which adds an output signal of the attenuator and an output signal of the second adder to output a result of the adding as an echo-cancelled signal.

* * * * *